(12) United States Patent
Giovenzana et al.

(10) Patent No.: US 9,466,318 B2
(45) Date of Patent: Oct. 11, 2016

(54) ALLOWING FAST DATA ZONE SWITCHES ON DATA STORAGE DEVICES

(71) Applicant: Western Digital Technologies, Inc., Irvine, CA (US)

(72) Inventors: Davide Giovenzana, Longmont, CO (US); Paul E. Soderbloom, Golden, CO (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 0 days.

(21) Appl. No.: 15/001,730

(22) Filed: Jan. 20, 2016

(65) Prior Publication Data

US 2016/0189734 A1 Jun. 30, 2016

Related U.S. Application Data (62) Division of application No. 14/582,663, filed on Dec. 24, 2014, now Pat. No. 9,257,134.

(51) Int. Cl.
| | | |
|---|---|---|
| *G11B 5/09* | (2006.01) | |
| *G11B 20/10* | (2006.01) | |
| *G11B 20/12* | (2006.01) | |
| *G11B 5/012* | (2006.01) | |
| *G11B 7/1267* | (2012.01) | |

(52) U.S. Cl.
CPC ............... *G11B 5/09* (2013.01); *G11B 5/012* (2013.01); *G11B 7/1267* (2013.01); *G11B 20/10268* (2013.01); *G11B 20/1217* (2013.01); *G11B 2020/1242* (2013.01)

(58) Field of Classification Search
CPC . G11B 5/82; G11B 20/10398; G11B 20/182; G11B 5/012; G11B 20/10268; G11B 20/10481; G11B 7/1267; G11B 11/10515; G11B 11/10504; G11B 11/10595; G11B 5/09; G11B 20/12; G11B 2020/1242; G11B 2020/185

USPC ...... 360/39, 53, 51; 369/13.04, 13.05, 13.14
See application file for complete search history.

(56) References Cited

U.S. PATENT DOCUMENTS

| | | | |
|---|---|---|---|
| 6,018,789 | A | 1/2000 | Sokolov et al. |
| 6,065,095 | A | 5/2000 | Sokolov et al. |
| 6,078,452 | A | 6/2000 | Kittilson et al. |
| 6,081,447 | A | 6/2000 | Lofgren et al. |
| 6,092,149 | A | 7/2000 | Hicken et al. |
| 6,092,150 | A | 7/2000 | Sokolov et al. |
| 6,094,707 | A | 7/2000 | Sokolov et al. |
| 6,105,104 | A | 8/2000 | Guttmann et al. |
| 6,111,717 | A | 8/2000 | Cloke et al. |
| 6,145,052 | A | 11/2000 | Howe et al. |

(Continued)

OTHER PUBLICATIONS

Notice of Allowance dated Oct. 5, 2015 from U.S. Appl. No. 14/582,663, 5 pages.

(Continued)

*Primary Examiner* — Ali Neyzari
(74) *Attorney, Agent, or Firm* — Brownstein Hyatt Farber Schreck, LLP (57) ABSTRACT

Some embodiments described herein are directed to reducing or eliminating latency caused by data zone switches in a rotating magnetic storage device. More specifically, some embodiments described herein are directed to storing parameters associated with different zones in a parameter register in response to one or more received commands.

20 Claims, 6 Drawing Sheets

(56) References Cited

U.S. PATENT DOCUMENTS

| | | | |
|---|---|---|---|
| 6,175,893 B1 | 1/2001 | D'Souza et al. |
| 6,178,056 B1 | 1/2001 | Cloke et al. |
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,469,960 B1 * | 10/2002 | Miyoshi | G11B 7/1267 369/13.05 |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |

(56) References Cited

U.S. PATENT DOCUMENTS

| | | |
|---|---|---|
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |

(56) References Cited

U.S. PATENT DOCUMENTS

| | | |
|---|---|---|
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 10/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,705,192 B1 | 4/2014 | Zhang et al. |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Schwartz et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 9,257,134 B1 * | 2/2016 | Giovenzana ............ G11B 5/09 |
| 2009/0113702 A1 | 5/2009 | Hogg |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2014/0201424 A1 | 7/2014 | Chen et al. |

OTHER PUBLICATIONS

Ex Parte Quayle Action dated Aug. 26, 2015 from U.S. Appl. No. 14/582,663, 4 pages.

* cited by examiner

ALLOWING FAST DATA ZONE SWITCHES ON DATA STORAGE DEVICES

CROSS REFERENCE TO RELATED APPLICATIONS

This application is a divisional of U.S. patent application Ser. No. 14/582,663, now U.S. Pat. No. 9,257,134, filed on Dec. 24, 2014, which is hereby incorporated by reference in its entirety.

TECHNICAL FIELD

The present disclosure is directed to data storage systems. More specifically, the present disclosure is directed to increasing the speed of media read and media write operations.

BACKGROUND

Many computing systems receive commands regarding the reading of data from and the writing of data to a data storage device such as a hard disk drive. Prior to writing the data to the hard disk drive, the data is typically encoded. Likewise, when data is read from the hard disk drive, the data is typically decoded. The encoding and decoding processes may take various amounts of time depending on the complexity of the data and/or the complexity of the decoding and encoding processes. The latency caused by the decoding and encoding processes may cause a delay in returning or accessing the data. This latency affects performance of the system as the processing of data associated with a received operation must be completed before processing data associated with a new operation can commence.

It is with respect to these and other general considerations that embodiments have been made. Although relatively specific problems have been discussed, it should be understood that the embodiments should not be limited to solving the specific problems identified in the background.

BRIEF DESCRIPTION OF THE DRAWINGS

Reference will now be made to representative embodiments illustrated in the accompanying figures. It should be understood that the following descriptions are not intended to limit the disclosure to one preferred embodiment. To the contrary, each is intended to cover alternatives, modifications, and equivalents as may be included within the spirit and scope of the described embodiments as defined by the appended claims.

The use of the same or similar reference numerals in different drawings indicates similar, related, or identical items where appropriate.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein.

Some of the embodiments described herein are directed to systems and methods for enabling fast data zone switches in a data storage device/system. For example, in a typical hard disk drive, data is stored on a magnetic media as a group of tracks with each group of tracks forming a data zone. Thus, a disk drive may be made up of a number of different data zones. Each of the data zones on the hard disk drive may have different operating parameters. Further, each operating parameter may be optimized for a particular zone.

For example, each zone may have various front-end parameters and back-end parameters that are optimized for that data zone. Exemplary front-end parameters for the data zones include Analog Front End parameters, Phase Locked Loop parameters, control-loops and the like. Exemplary back-end parameters include decoder and encoder parameters. In addition to the above, each zone may have a different density and as such, when data is written to or read from the zone, the reading and writing of the data may be performed at different frequencies.

In current solutions, when a read command is received by a data storage system, the data must be completely decoded prior to making any changes to either the front-end parameters or the back-end parameters for a subsequent read command. As such, when a subsequent read command is received, such as, for example, a non-sequential read command in which data is stored in a different data zone, the read command is not serviced until decoding of the data of the previous read command is complete. When the data from the previous read command is complete, the subsequent read command may be serviced, the parameters changed, and data associated with the read command may be accessed.

In the example above, the data associated with non-sequential read command is stored in a different zone and as such, one or more front-end parameters or back-end parameters may need to be changed prior to servicing the received read command. However, as discussed above, the decoding of the data associated with the previously received read command must be completed before any changes can be made to either the front-end parameters or back-end parameters. Once the decoding is complete, a read element of the hard disk drive has been positioned at or within the new zone, changes the parameters and then begins reading the data. However, the delay caused by the changing the parameters after the decoding is complete and as the read element moves to a different zone may introduce undesired latency in the data storage system with severe performance degradation.

Similarly, when a data storage system performs a write command, the data to be written must be encoded and completely written to a zone before changes to any of the parameters are made. This may also cause undesired latency in the data storage system with severe performance degradation.

Accordingly, some embodiments of the present disclosure enable the read element (and/or write element) of a data storage system to be moved to different data zones as soon as the media read or write operation for the current zone is complete without waiting for decoder and encoder latency. As will be explained below, firmware of the data storage system will load parameters associated with a new data zone as soon as the decoder operation being performed in the current zone has started. More specifically, encoding and decoding parameters associated with the new zone are stored in and loaded from a register such that when a data zone switch or seek occurs, the operations on the data in the new zone can commence with the stored parameters that are pre-loaded into the register.

Thus, once the read element has settled in the new zone, a read channel of the data storage system can commence reading data from the new zone even while the decoder is still working on sectors from previous zones. Thus, the decoder (e.g., implemented based on a low density parity check based algorithm) of the present disclosure permits parallel processing of data such that data that originates from or belongs in various data zones can be concurrently in-flight to the decoder and may be decoding the data in parallel. In order to ensure that the data is decoded or encoded properly, the read channel of the data storage system dynamically loads data, zone dependent media parameters, zone dependent decoder parameters, and zone dependent encoder parameters for each sector or zone from the register when the read element has been positioned over that particular sector or zone.

For example, some embodiments described herein are directed to a system and method for reading data from a storage device having a head and a storage medium. According to these embodiments, a first read command is received from a host device. The first read command may be for data that is located in a first location on the storage medium. In response to receiving the first read command, the head navigates to the first location and the data associated with the first read command is read from the first location. The data is then decoded using a first parameter that is associated with the first location.

Prior to completing the decoding of the data associated with the first read command, a second read command is received from the host device. The data associated with the second read command is in a second location. As such, the head navigates to the second location and the data associated with the second read command is retrieved. The retrieved data associated with the second read command is then associated with a second parameter. Once the decoding of the data associated with the first command is complete, the second parameter is loaded from a register and the data associated with the second read command is decoded using the second parameter.

Also disclosed is a method and system for writing data to a storage device comprising a head and a storage medium. According to these embodiments, a first write command is received from a host device. In response to the received write command, the head navigates to a first location on the storage medium. Once the head is in position, data associated with the first write command is written to the first location using a first parameter. Prior to completing the writing of the data associated with the first write command at the first location, a second write command is received from the host device. The second write command is associated with a second parameter and the data associated with the second command is primed using the second parameter. Upon completing the writing of the data associated with the first write command at the first location, the head navigates to the second location on the storage medium and commences writing the data associated with the second write command from an auxiliary storage location to the second location using the second parameter.

Also disclosed is a data storage device having a memory, a channel having a parameter register and a controller. In some embodiments, the controller receives a first read command from a host device prior to completion of a decoding process of data associated with a previously received read command. The controller stores data associated with the first read command in the channel and also associates the data associated with the first read command with a first parameter in the parameter register. The channel (e.g., a read channel) also initiates decoding of the data stored in the channel using the associated parameter prior to completion of the decoding process of the data associated with the previously received read command.

In other embodiments of the present disclosure, a device having a controller and a channel with a parameter register is disclosed. The controller of the device is configured to receive a first read command from a host device prior to completion of a decoding process of data associated with a previously received read command. When the read command is received, data associated with first read command is stored in the channel and the data is associated with a first parameter in the parameter register. Prior to completion of the decoding process of the data associated with the previously received read command, the channel (e.g., the read channel) initiates decoding of the data stored in the channel using the associated first parameter.

Figure 1:
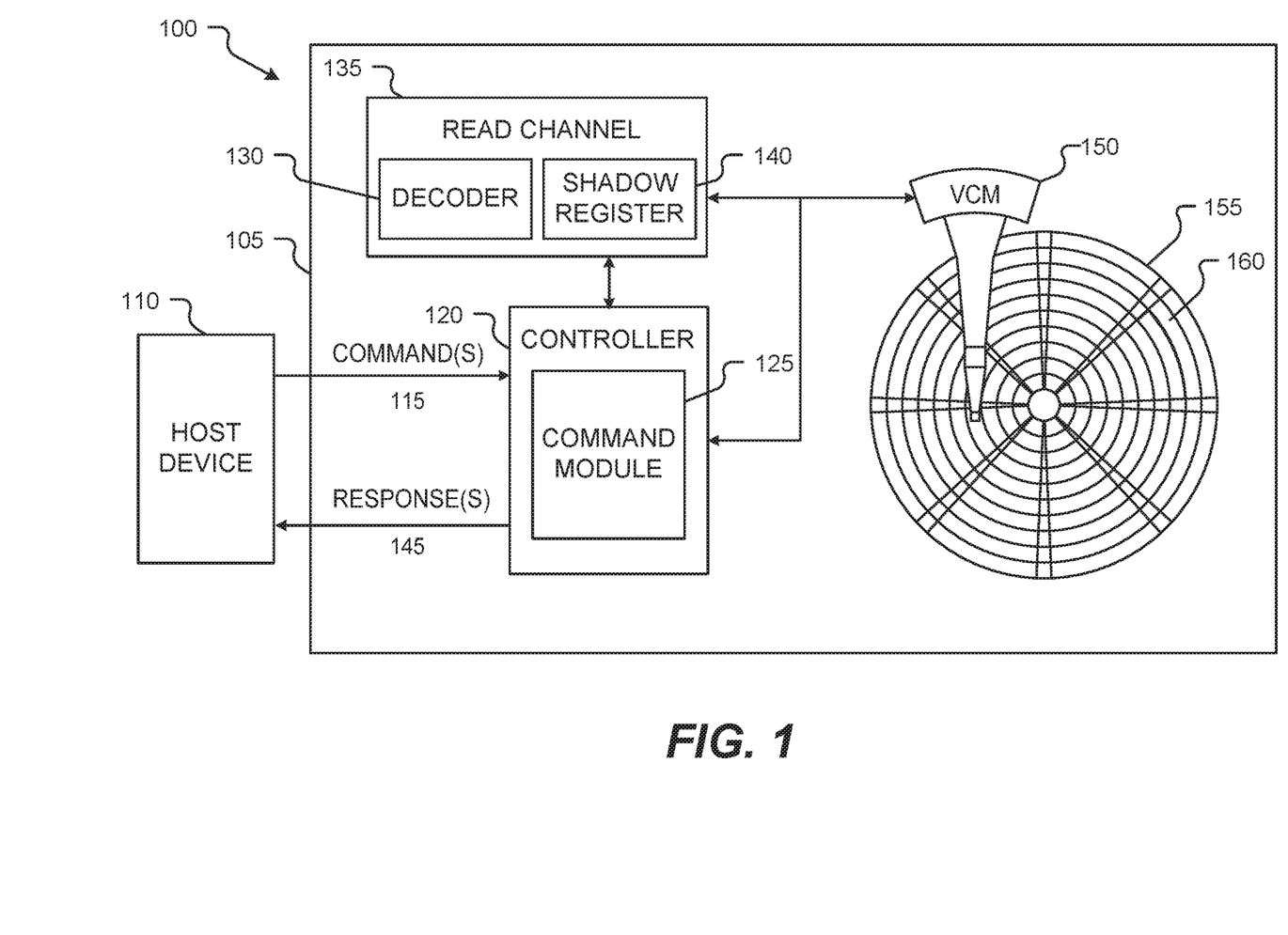
FIG. 1 illustrates an exemplary data storage system for that may be used with one or more embodiments of the present disclosure.

Turning to the figures, FIG. 1 illustrates an exemplary data storage system 100 for servicing commands 115 according to one or more embodiments of the present disclosure. As shown in FIG. 1, the system 100 includes a host device 110 that sends various commands 115 to a data storage device 105. In some embodiments, the commands 115 can be any number of media related commands including, but not necessarily limited to, random media write commands, sequential media write commands, random media read commands and sequential media read commands. The host device 110 may be any suitable electronic device such as a laptop computer, desktop computer, server, cellular phone, tablet computer, and so on. In some embodiments, the host device 110 can be implemented as a system of individual electronic devices, such as, for example, a network of servers.

Once the commands 115 have been received and processed, the data storage device 105 may send one or more responses 145 to the host device 110. The responses 145 may include confirmation that the commands 115 have been processed and/or completed. The responses 145 may also include any data requested by the commands 115.

The storage device 105 may also include a controller 120 configured to service the commands 115 that are received from the host device 110 and provide the response 145 to the host device 110. In some embodiments, the controller 120 may include a command module 125 that is configured to determine the type of command 115 that is received and the type of response 145 that is to be sent. The command module 125 may also be configured to determine which zone 160 on the rotating magnetic storage 155 the received command 115 is associated with. For example, if back-to-back non-sequential media read commands are received by controller 120, the command module 125 may determine that data associated with the first read command is in a first data zone and data associated with the second read command is in a second data zone. Likewise, if a write command is received by the controller 120, the command module 125 may be configured to determine which zone 160 data associated with the write command should be written to.

As discussed above, each zone 160 may be associated with different encoding or decoding parameters. Thus, as data is either read from or written to each zone 160 and subsequently decoded or encoded, decoding/encoding parameters associated with each zone 160 must be used.

More specifically, the storage device 105 includes a read channel 135 that is configured to read data from or write data to the various zones 160 of the rotating magnetic storage 155 using a voice coil motor 150 that includes a reading element and/or a writing element. For example, when a command is received, the controller 120 may instruct a servo system of the storage device 105 to position the read and/or write element actuated by the voice coil motor 150 over a particular zone 160 of the rotating magnetic storage 155 in response to a seek command. Once the read element is positioned at or in the particular zone 160, the read channel 135 receives the processing parameters that are to be used in various read and write operations for the particular zone.

For example, during a read operation, once the read head is positioned over a data zone 160, the read channel 135 processes the data using various front-end parameters that are optimized for that particular zone. More specifically, the read channel 135 may perform a media read on the data within the zone using specific media read parameters that are associated with the zone. Upon completion of the media read, the data is then stored for decoding at a subsequent time. Put another way, the read channel initially processes the data and queues the data for subsequent decoding (e.g., the decoding of the data begins when a current decoding process completes). Once the decoder 130 has completed any pending decoding processes, the decoder 130 associated with the read channel 135 may then decode the data. As discussed above, the decoder 130 also has various parameters that optimize the decoding of the data based on, for example, where the zone 160 in which the data is located. As such, the read channel 135 may be required to determine and/or load the specific decoder parameters from a register.

As discussed above, in current solutions, decoding (or encoding) of data associated with a received command must be completed prior to changing any front-end parameters or decoding parameters of the read channel. This can add considerable delays when a subsequent command is received that requires that data be read from or written to a different zone.

However, some embodiments of the present disclosure bifurcate the front-end processing of the data from the back-end processing (e.g., decoding/encoding process) of the data. More specifically, the read channel 135 of the present disclosure may be configured to load front-end parameters for the various zones in response to a received command 115 while enabling the decoding or encoding of data from a previously received command to asynchronously continue.

For example, in order to reduce, minimize or eliminate latency caused by zone switching and the decoding process, the read channel 135 may include a memory (e.g., in the form of a shadow register 140) that is configured to store parameters that will be used by the decoder 130 when decoding data from each zone 160. For example, the shadow register 140 may be configured to store N number of decoder optimized values for the various zones 160 of the rotating magnetic storage 155. Thus, when multiple commands 115 are received, the read channel 135 can service the received commands using the optimized front-end parameters while the decoding or encoding process occurs in the background using the encoding or decoding parameters associated with the previously received command.

For example, if a first read command is received, controller 120 is configured to determine the zone 160 in which the data to be read is located. As the read element is positioned within the identified zone 160, the read channel 135 (or firmware associated with the read channel 135) may determine, generate or load the front-end parameters and the back-end parameters (e.g., decoding parameters) that are optimized for the identified zone 160. More specifically, the back-end parameters for the decoding process may be stored or otherwise written to the shadow register 140. Once the read element has been positioned in the identified zone 160, the read channel 135 reads the data from the identified zone using, for example the front-end parameters, loads the back-end parameters, and begins an asynchronous decoding process using the back-end parameters stored in the shadow register 140.

During the decoding process, a second read command may be received from the host device 110. Once the second read command is received, the controller 120 may determine that the data associated with the second read command is in a second data zone. As with the first data zone, the second data zone may have decoding parameters that are optimized for the second data zone. Accordingly, the read channel 135 may be configured to determine whether there is room in the shadow register 140 to store the decoder parameters associated with the second zone. If there is room in the shadow register 140 for the decoder parameters associated with the second zone, those parameters are stored in the shadow register 140 and the read element is moved to the new data zone.

Once the read element has been positioned in the second zone, the read channel 135 reads the target sectors. More specifically, the read channel 135 reads the data using various front-end parameters that are optimized for the second zone. This process may continue for each subsequent received command so long as there is room in the shadow register 140 for additional decoding parameters.

Continuing with the example from above, once the decoding process associated with the first read command is complete, the decoder 130 loads the decoding parameters associated with the second read command from the shadow register 140. The decoder 130 then asynchronously performs the decoding of the data associated with the second read command. The asynchronous decoding of the data associated with the second read command may continue even when subsequent read and/or write commands are received.

Although the example above is directed to read commands, the read channel 135 of the present disclosure may also be used to reduce, minimize or eliminate latency caused by zone switching in write commands. For example, when a first write command is received from the host device 110, the controller 120 may be configured to determine which zone 160 the data is to be written to and the read channel 135 and/or the controller 120 may determine which parameters are to be used when writing data to that zone. For example, each zone 160 may have a frequency that is optimized for that particular zone. Thus, when the write element has navigated to the identified zone, the data is written to the zone using the frequency optimized for that zone.

While the data associated with the first write command is being written to the identified zone, a second write command may be received from the host 110. The controller 120 may determine that the data associated with the second command is to be written in a second zone. As with the first zone, the second zone has an optimized write frequency. However, because the data from the first write command is still being written to the first zone, the data associated with the second zone is primed and stored in the read channel 135. In some embodiments, although the data associated with the second command is to be written to the media in the second data zone using a second frequency, the data associated with the second command is written or otherwise stored in the read channel 135 using the first frequency (e.g., the frequency at which the data associated with the first command is being written to the first zone).

Once the data associated with the first write command has been written to the first zone (and the priming of the data associated with the second command has started), the write element is navigated to the second zone and the data associated with the second command is written at the second zone (once encoding has completed) using the second frequency. This process may continue for subsequently received write commands. Although first and second write commands are specifically mentioned, it is contemplated that the read channel 135 may be primed and store multiple write commands prior to completing the writing of data associated with a pending write command.

Figure 2A:
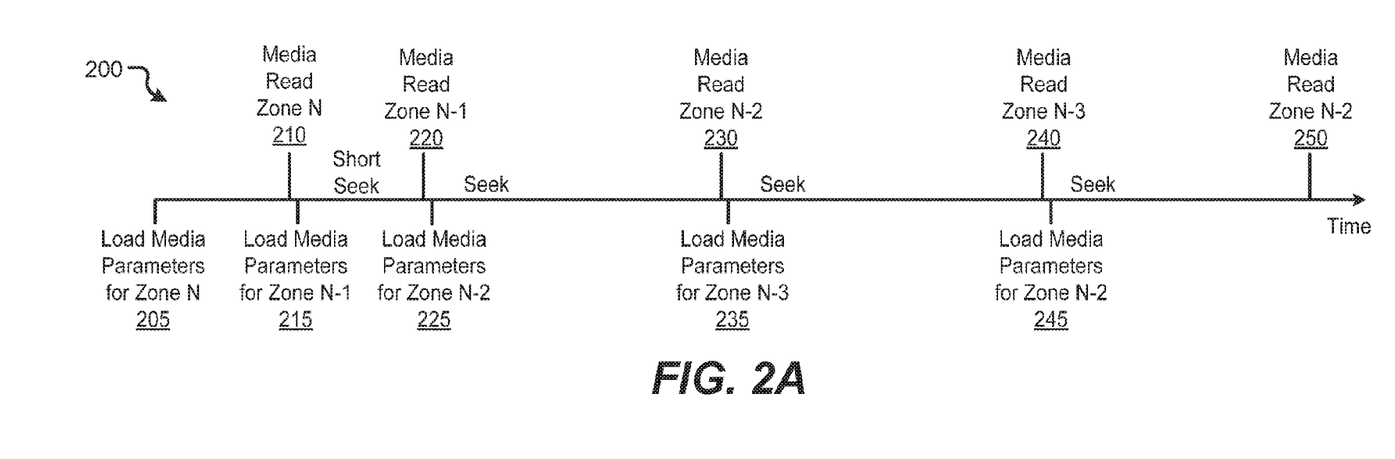
FIG. 2A is a timeline that illustrates various media read commands that may be received by a data storage system according to current implementations.

FIG. 2A shows a timeline 200 that illustrates various media read commands that may be received by a data storage system according to various embodiments of the present disclosure. FIG. 2B-FIG. 2F illustrate an exemplary register, such as, for example, shadow register 140 (FIG. 1) that may be used to store decoder parameters from various zones of a data storage device according to one or more embodiments of the present disclosure.

In the timeline 200 shown in FIG. 2A, one or more read commands associated with different zones may have already been received from a host device, such as, for example, host device 110. In other implementations, the various read commands may be received at various points along the timeline 200. However, these receipt of the read commands have been omitted for simplicity.

Figure 2B:
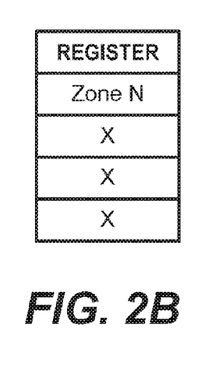
FIG. 2B-FIG. 2F illustrate an exemplary register that stores parameters of a data storage zone of a data storage device according to one or more embodiments of the present disclosure.

As discussed above, once a read command is received, decoding parameters associated with the zone in which the data is to be read from are stored in a register. For example, in response to a first read command being received, a determination is made as to which zone the requested data is located. In this example, the data is determined to be located in Zone N. As such, the media read parameters for Zone N are loaded at point 205. At point 210, a media read is performed on the data in Zone N using the media read parameters. Although the data has been read from Zone N in this example, it has not yet been decoded. As discussed above, the decoding process of the current disclosure is separate from the media read and may occur at a different time. As such, the decoding parameters associated with Zone N are stored in a register such as shown in FIG. 2B.

In some embodiments, each of the media reads of the different zones shown on the timeline 200 may be performed by a read channel, such as, for example, read channel 135 (FIG. 1) of the data storage device. As discussed above, each of the different media read commands may have media read parameters that are used to read the data in the particular zone. Likewise, each zone has associated decoding parameters that are stored in a register and may be subsequently loaded and used to decode the data that was read. Once a decoding process for a previously received read command is complete, the decoder loads the parameters from the register and begins decoding the data. Continuing the example from above, once the media read of Zone N is complete and the decoder has finished decoding data from a previously received read command (if any) decoder parameters for Zone N will be loaded from the register and the decoding process for the data from Zone N may commence. In some embodiments, the decoding process and the media read commands may be in parallel. Thus, the data from two different zones may be processed at the same time or substantially the same time.

Figure 2C:
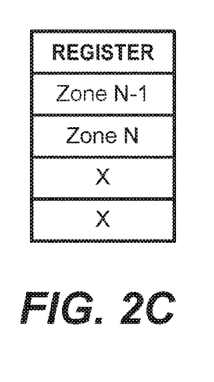

At point 215 on the timeline 200, media read parameters for Zone N-1 are loaded in response to a received read command. Likewise, decoder parameters for Zone N-1 are stored in the register. For example and as shown in FIG. 2C, the register now has two entries: one for Zone N and one for Zone N-1. Once the head has navigated to Zone N-1, a media read of Zone N-1 220 may commence using the media read parameters that were loaded for Zone N-1 at point 215.

Figure 2D:
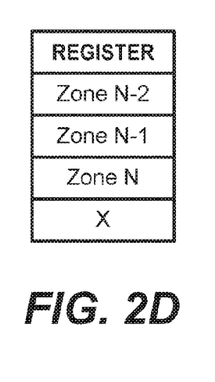

If a third read command is received and the data associated with the third read command is determined to be in Zone N-2, media read parameters for Zone N-2 are loaded at point 225 and the decoder parameters associated with Zone N-2 are stored in the register such as shown in FIG. 2D. After a seek operation, a media read of Zone N-2 may be performed at point 230 using the media read parameters associated with Zone N-2.

Figure 2E:
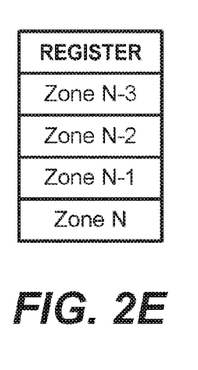

As with the other commands above, if a fourth read command is subsequently received and the data associated with the fourth read command is determined to be in a fourth zone-Zone N-3, the media read parameters associated with Zone N-3 are loaded at point 235 and the decoder parameters for Zone N-3 are stored in the register such as shown in FIG. 2E. A media read of Zone N-3 may then be performed at point 240 using the media read parameters of Zone N-3.

Figure 2F:
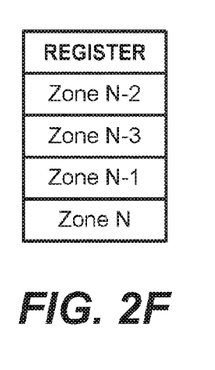

In some embodiments, the register that stores the decoder parameters may operate in a first in, first out manner. Thus, once parameters for a particular zone have been used and a subsequent read will not use the stored parameters, the parameters for that zone will be removed from the register when parameters from a different zone are received. However, if a read command is received for a zone that already has parameters stored in the register (e.g., a read command is received for Zone N-2), the parameters for that zone may be moved to the top of the register such as shown in FIG. 2F.

For example, if a fifth read command is received, and it is determined that the fifth read command is associated with Zone N-2, the media read parameters for zone N-2 will be loaded at point 245. After a seek is performed, a media read is performed on Zone N-2 using the media read parameters that were loaded at point 245. As also shown in FIG. 2F, the register has been updated such that the decoder parameters for Zone N-2 are now at the top of the queue. As discussed above, once the channel, and more specifically the decoder, is ready to decode the data that is received from the various media reads, the decoder parameters associated with the data to be decoded are loaded from the register.

Although a first in, first out register is specifically mentioned, it is contemplated that other ordering schemes may be used.

Figure 3:
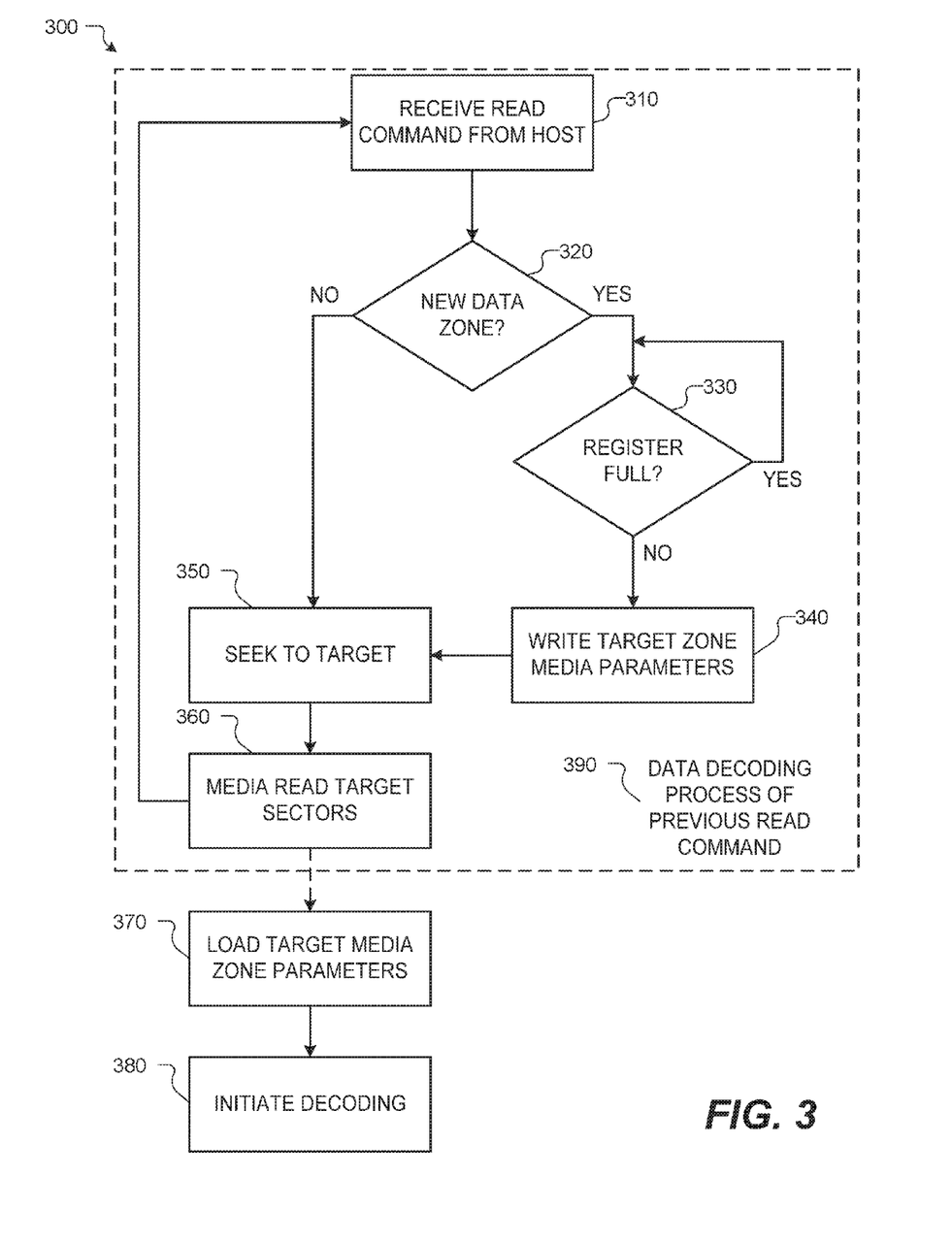
FIG. 3 illustrates a method for reading data from various zones of a data storage device according to one or more embodiments of the present disclosure.

FIG. 3 illustrates a method 300 for reading data from various zones of a data storage device according to one or more embodiments of the present disclosure. In some embodiments, the method 300 may be used with the data storage system 100 such as shown and described above with respect to FIG. 1. Accordingly, reference may be made to one or more components described above.

Method 300 begins at operation 310 when a command is received from a host device. In some embodiments the command may be a media read command. Once the command is received, a determination 320 is made as to whether data associated with the received read command is in a data zone that is different from the data zone that the read element of the data storage device is currently operating in.

If it is determined that the data zone associated with the received command is not different, flow proceeds to operation 350 and a seek is performed in which a read element of the data storage device is positioned at the particular target area within the zone. The data is then read such as will be outlined in greater detail below.

However, if it is determined that the data zone associated with the received read command is different, flow proceeds to operation 330 and a determination is made as to whether a register associated with a read channel of the data storage device is full. If the register is full, the command is put on hold until a new entry is available in the register. For example, the parameters associated with the new zone are not loaded into the register until space in the register becomes available. When the register has room, flow proceeds to operation 340 and the target zone parameters (e.g., the parameters associated with the zone from which the data is to be read) are written to the register.

Flow then proceeds to operation 350 in which a seek is performed. In some embodiments, the seek causes the read element of the data storage device to be positioned in the particular zone from which the data is to be read. Flow then proceeds to operation 360 and a media read is performed on the target sectors within the zone. For example, a read channel may load various front-end parameters in order to initially read the data from the target zone.

Once the media read is complete, flow may proceed back to operation 310 and another read command may be received such as described above. More specifically, as shown in FIG. 3, a decoding process 390 (illustrated as the dashed box) for data from a previously received read command may be occurring during the method 300. That is, operation 310 through operation 360 may be occurring simultaneously with or substantially simultaneously with a currently executing data decoding process. However, once the decoding of the data from the previously received command is complete, flow proceeds to operation 370 (shown by the dashed arrow) and the decoder may load the parameters for the zone associated with the command that was received in operation 310 and initiate the decoding process 380 using the newly loaded decoder zone parameters.

Thus, according to various embodiments, data from different zones can be concurrently in flight to the decoder at one time. In addition, the decoder can switch between the decoding of different sections from different zones by loading settings for the zone from the register.

Figure 4:
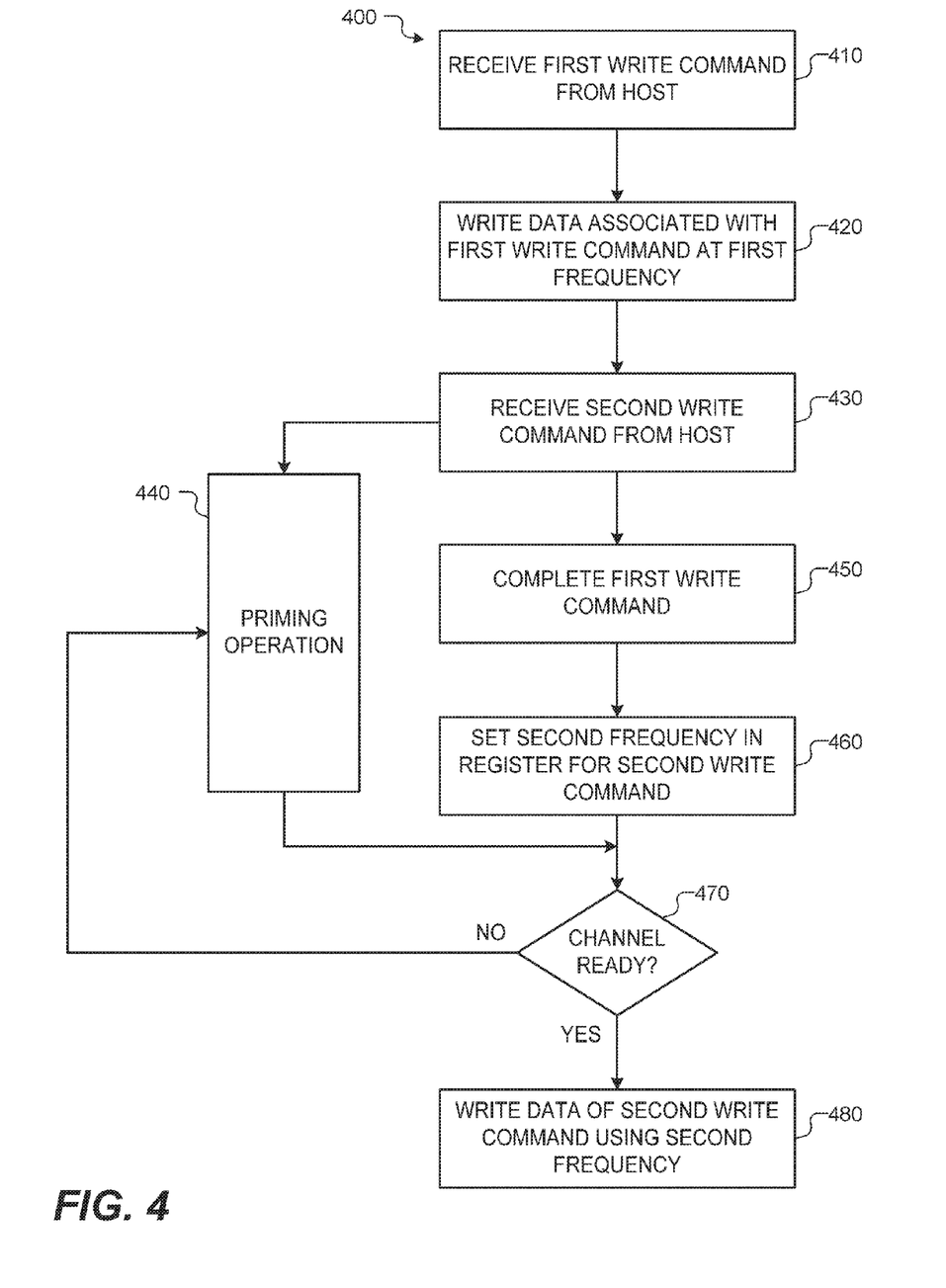
FIG. 4 illustrates a method for writing data into various zones of a data storage device according to one or more embodiments of the present disclosure.

FIG. 4 illustrates a method 400 for writing data into various zones of a data storage device according to one or more embodiments of the present disclosure. In some embodiments, method 400 may be used by the data storage system 100 and/or data storage device 105 described above with respect to FIG. 1. As such, reference may be made to similar components described above.

Method 400 begins when a first write command is received from a host device. In some embodiments, the host device may be similar to host device 110. Once the write command is received, a determination may be made as to which zone the data is to be written to. Once the determination has been made, flow proceeds to operation 420 and the data associated with the received write command is written to the determined data zone using a first frequency. In some embodiments, the data is encoded and written to the zone at the first frequency.

While the data is being written to the zone at the first frequency, flow proceeds to operation 430 and a second write command is received from the host device. Like the data from the first write command, a determination may be made as to which zone the data from the second write command is to be written. As discussed above, if the data associated with the second write command is to be written in a zone that is different from the zone in which the data associated with the first command is currently being written, the data associated with the second command may be written at a different frequency.

Accordingly, flow proceeds to operation 440 and the data associated with the second read command is primed (e.g., data associated with the received command is passed to the read channel before the media write occurs) or otherwise stored in a read channel. As shown in FIG. 4, the priming of the data may occur concurrently or substantially concurrently with the writing of the data associated with the first write command. In some embodiments, the priming operation occurs at the frequency at which the current write operation is occurring. Thus, even if the data associated with the second command is to be written to the second zone at a second frequency, the data associated with the second write command is primed using the first frequency.

However, once the first write command is complete 450, (and although the priming operation 440 may be in process) flow proceeds to operation 460 and the frequency associated with the second command is set. Flow then proceeds to operation 470 and a determination is made as to whether the channel is ready. More specifically, a determination is made as to whether the data associated with the second write command has finished encoding. When it is determined that the encoding of the data associated with the second command is complete, flow proceeds to operation 480 and the data associated with the second command is written to the zone using the second frequency.

Figure 5A:
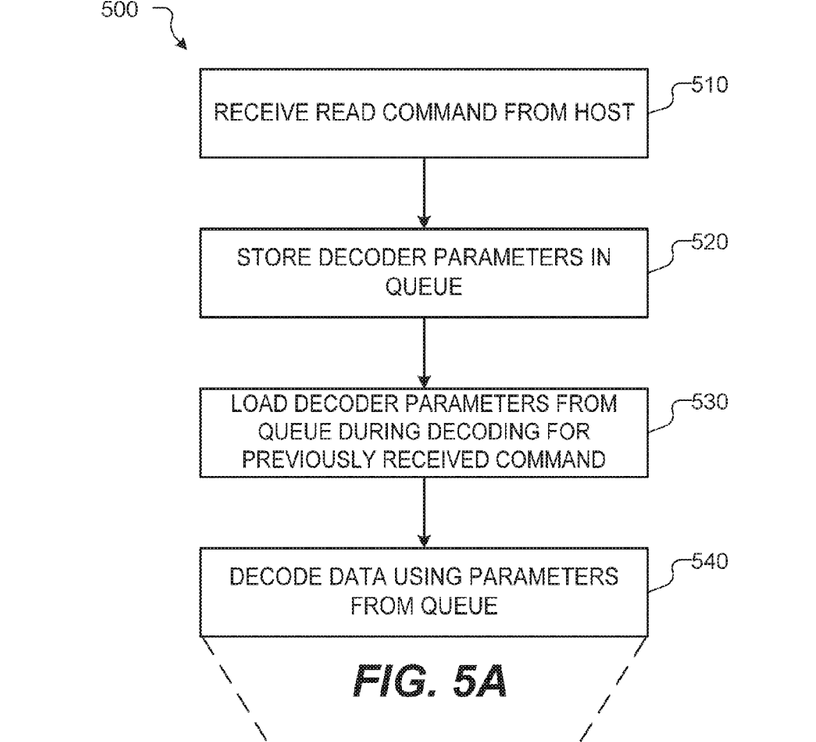
FIG. 5A-FIG. 5B are a block and a flow diagram combination that illustrate a method for reading data from various zones of a data storage device according to one or more embodiments of the present disclosure.
Figure 5B:
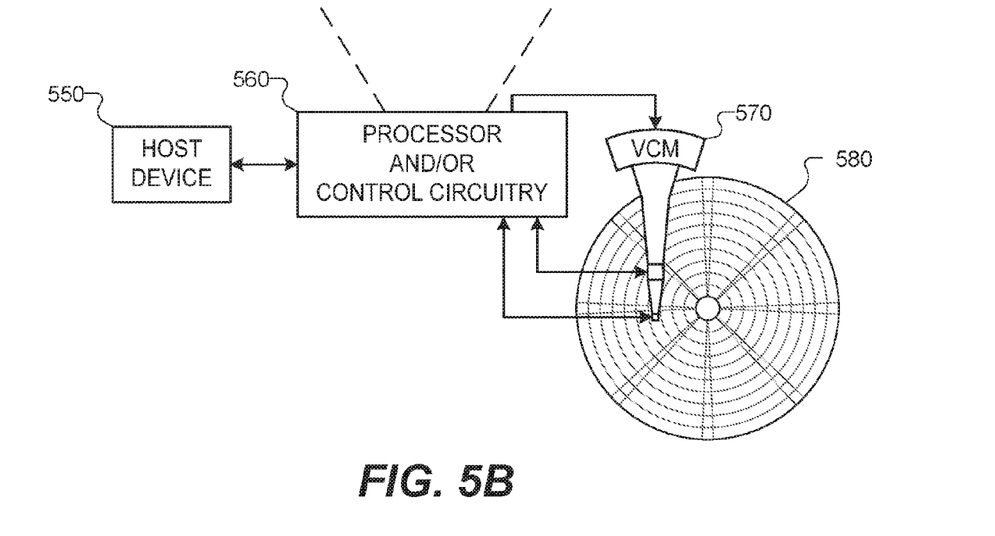

FIG. 5A-FIG. 5B are a block and a flow diagram combination that illustrate a method 500 for reading data from various zones of a data storage device according to one or more embodiments of the present disclosure. In some embodiments, the system of FIG. 5B described below may be similar to the system 100 described above.

As shown in FIG. 5A, the method 500 begins when a read command is received from a host device such as, for example, host device 550. Once the read command is received, a processor and/or control circuitry 560 may be configured to determine which zone of a rotating magnetic storage 580 the data is located. As part of this process, the processor and/or the control circuitry 560 may also determine various front-end and/or back-end parameters that are needed to decode the data once it is read from the particular zone.

Once these parameters are determined, flow proceeds to operation 520 and the decoder parameters are stored in a queue. In some embodiments, the decoder parameters are stored in a register.

Flow then proceeds to operation 530 and the stored decoder parameters are loaded during a decoding process of a previously received command. That is, during a decoding process from a previously received command, and in order to reduce, minimize or eliminate latency caused by a data zone switch, parameters associated with a different zone are loaded by the read channel so when the decoding process is complete, the decoding of the data in the second zone may immediately commence once the read element actuated by the voice coil motor 570 has been positioned in the determined zone.

Once the read element has been positioned within the determined zone and the previous decoding process is complete, data associated with the received command from operation 510 is decoded 540 using the parameters stored in the queue.

Figure 6A:
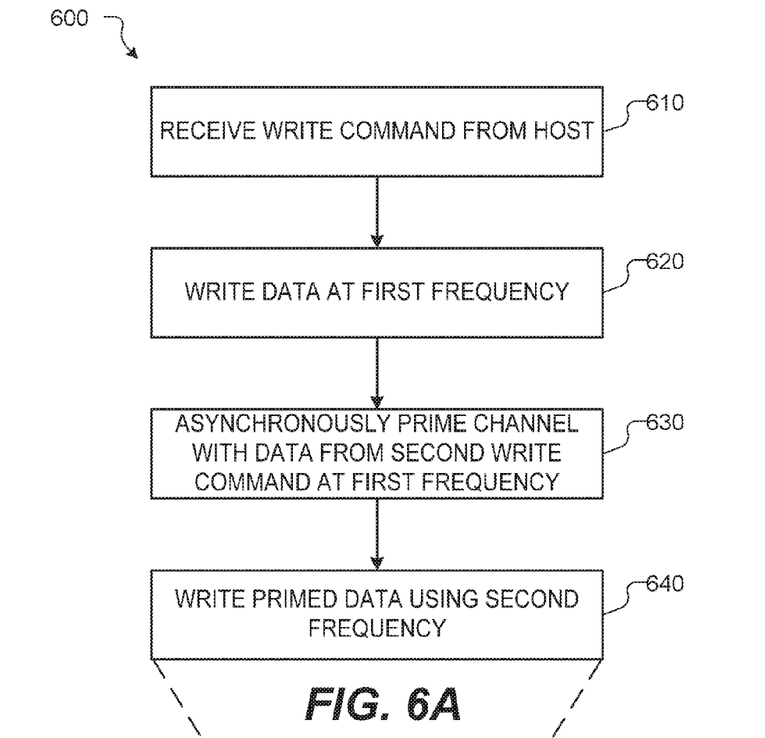
FIG. 6A-FIG. 6B are a block and a flow diagram combination that illustrate a method for writing data to various zones of a data storage device according to one or more embodiments of the present disclosure.
Figure 6B:
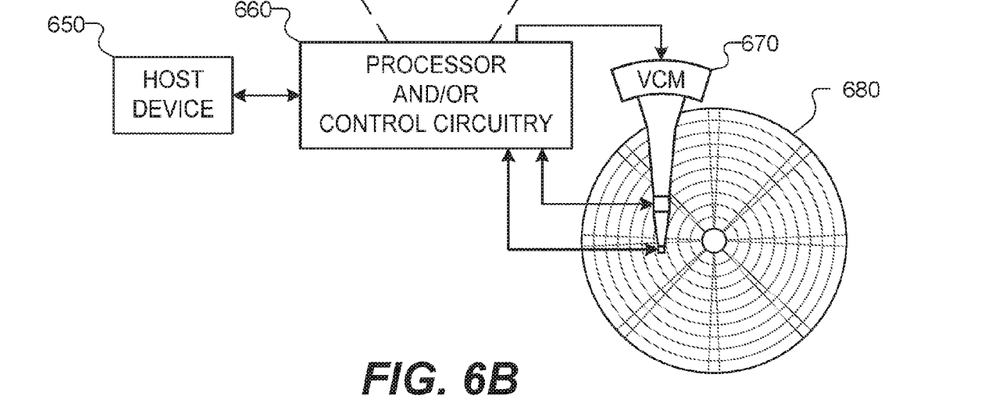

FIG. 6A-FIG. 6B are a block and a flow diagram combination that illustrate a method 600 for writing data to various zones of a data storage device according to one or more embodiments of the present disclosure. In some embodiments, the system of FIG. 6B described below may be similar to the system 100 described above.

Method 600 begins at operation 610 when a write command is received from a host device, such as, for example host device 650. Once the write command is received a determination may be made as to which data zone of a rotating magnetic storage 680 the data associated with the write command is to be written to. In some embodiments, this determination may be made by a processor and/or control circuitry 660.

Once the zone determination has been made, flow proceeds to operation 620 and the data associated with the received write command is written to the zone at a first frequency. While the data is being written to the zone at the first frequency, a channel of storage device may be primed using data from a second write command. In some embodiments, although the data associated with the second write command is to be written to a different zone at a different frequency, the data associated with the second write command is primed in the channel using the first frequency.

Once the data associated with the first write command from operation 610 has been written to the zone of the rotating magnetic storage 680, the voice coil motor 670 navigates the write element to the zone associated with the second write command and the primed data associated with the second read command is written 640 to the second zone using a second frequency. As discussed above, the second frequency is a frequency that is associated with the second zone.

While the examples described above relate to read and write commands coming from a host device, the commands can be self-generated by the data storage device. Accordingly, the methods described above can be used when processing of read commands and write commands are internally initiated.

In one embodiment, the above described methods may be embodied in a computer-readable medium encoding computer executable instructions which, when executed by a processor, performs the methods disclosed.

Any suitable control circuitry may be employed to implement the flow diagrams in the above embodiments, such as any suitable integrated circuit or circuits. For example, the control circuitry/controller may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry/controller may include a suitable preamp circuit implemented as a separate integrated circuit, integrated into the read channel or disk controller circuit, or integrated into a SOC.

In one embodiment, the control circuitry/controller comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

As used herein, "non-volatile solid-state memory," "non-volatile memory," "NVM," or variations thereof may refer to solid-state memory such as NAND flash. "Non-volatile memory" may additionally refer to rotating magnetic media. Some embodiments of the present disclosure may also be useful in hard drives and hybrid drives including both solid-state and hard drive components. Solid-state memory may comprise a wide variety of technologies, such as flash integrated circuits, Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), MRAM, or other discrete NVM (non-volatile solid-state memory) chips. The non-volatile solid-state memory arrays or storage devices may be physically divided into planes, blocks, pages, and sectors, as is known in the art. Other forms of storage (e.g., battery backed-up volatile DRAM or SRAM devices, magnetic disk drives, etc.) may additionally or alternatively be used.

Additionally, embodiments of the present disclosure are described above with reference to block diagrams and operational illustrations of methods and the like. The operations described may occur out of the order as shown in any of the figures. One or more operations may be removed or executed substantially concurrently. For example, two blocks shown in succession may be executed substantially concurrently. Additionally, the blocks may be executed in the reverse order.

The description and illustration of one or more embodiments provided in this disclosure are not intended to limit or restrict the scope of the present disclosure as claimed. The embodiments, examples, and details provided in this disclosure are considered sufficient to convey possession and enable others to make and use the best mode of the claimed embodiments. Additionally, the claimed embodiments should not be construed as being limited to any embodiment, example, or detail provided above. Regardless of whether shown and described in combination or separately, the various features, including structural features and methodological features, are intended to be selectively included or omitted to produce an embodiment with a particular set of features. Having been provided with the description and illustration of the present application, one skilled in the art may envision variations, modifications, and alternate embodiments falling within the spirit of the broader aspects of the embodiments described herein that do not depart from the broader scope of the claimed embodiments.

We claim:

1. A data storage device, comprising:
   a memory;
   a channel having a parameter register; and
   a controller configured to:
   initiate processing of a first read command prior to completion of a decoding process of data associated with a previously received read command;
   store data associated with the first read command in the channel; and
   associate the data associated with the first read command with a first parameter in the parameter register, wherein the channel is configured to initiate decoding of the data stored in the channel using the associated first parameter prior to completion of the decoding process of the data associated with the previously received read command.

2. The data storage device of claim 1, wherein the channel further comprises a low density parity check decoder, wherein the low density parity check decoder is configured to decode the data associated with the previously received read command.

3. The data storage device of claim 1, wherein the channel is further configured to determine whether the parameter register has capacity for the parameter associated with the data in the channel.

4. The data storage device of claim 1, wherein the first parameter is a decoder setting associated with the first read command.

5. The data storage device of claim 1, wherein the data associated with the previously received read command is in a first storage location and the data associated with the first read command is in a second storage location.

6. The data storage device of claim 1, wherein the controller is further configured to:
   receive a second read command from a host device prior to completion of the decoding process of the data associated with the previously received read command;
   store data associated with the second read command in the channel; and
   associate the data associated with the second read command with a second parameter in the parameter register.

7. A device, comprising:
   a channel having a parameter register; and
   a controller configured to:
   initiate processing of a first read command prior to completion of a decoding process of data associated with a previously received read command;
   store data associated with the first read command in the channel; and
   associate the data associated with the first read command with a first parameter in the parameter register, wherein the channel is configured to initiate decoding of the data stored in the channel using the associated first parameter prior to completion of the decoding process of the data associated with the previously received read command.

8. The device of claim 7, wherein the channel further comprises a parity check decoder configured to decode the data associated with the previously received read command.

9. The device of claim 7, wherein the channel is further configured to determine whether the parameter register has capacity for the parameter associated with the data in the channel.

10. The device of claim 7, wherein the first parameter is a decoder setting associated with the first read command.

11. The device of claim 7, wherein the first parameter is a decoder setting associated with a location of the data associated with the first read command.

12. The device of claim 7, wherein the first parameter is a frequency setting associated with a location of the data associated with the first read command.

13. The device of claim 7, wherein the data associated with the previously received read command is in a first storage location and the data associated with the first read command is in a second storage location.

14. The device of claim 7, wherein the controller is further configured to:
    receive a second read command prior to completion of the decoding process of the data associated with the previously received read command;
    store data associated with the second read command in the channel; and
    associate the data associated with the second read command with a second parameter in the parameter register.

15. The device of claim 14, wherein the second parameter is different than the first parameter.

16. The device of claim 14, wherein the controller is further configured to:
    receive a third read command prior to completion of the decoding process of at least one of the previously received read command, the first read command or the second read command;
    store data associated with the third read command in the channel; and
    determine whether the data associated with the third read command is associated with at least one parameter previously stored in the parameter register.

17. The device of claim 16, wherein the controller is further configured to use the at least one parameter that was previously stored in the parameter register when decoding the third read command.

18. A device, comprising:
    a channel;
    a parameter register associated with the channel; and
    a controller configured to:
    initiate processing of a read command while executing a decoding process associated with a previously received read command;
    store data associated with the read command in the channel;
    determine whether a parameter in the parameter register is associated with the data; and
    cause the channel to initiate decoding of the data stored in the channel using the parameter prior to completion of the decoding process of the data associated with the previously received read command.

19. The device of claim 18, wherein the controller is further configured to store a second parameter in the parameter register when it is determined that the parameter in the parameter register is not associated with the data.

20. The device of claim 19, wherein the channel is further configured to determine whether the parameter register has capacity for the second parameter.

* * * * *